United States Patent
Miyajima et al.

(10) Patent No.: US 11,824,472 B2
(45) Date of Patent: Nov. 21, 2023

(54) MOTOR DRIVE APPARATUS AND COOLING APPARATUS

(71) Applicant: DAIKIN INDUSTRIES, LTD., Osaka (JP)

(72) Inventors: Takayuki Miyajima, Osaka (JP); Takahiro Yokoyama, Osaka (JP); Tetsuo Nakata, Osaka (JP); Junpei Yamamoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 59 days.

(21) Appl. No.: 17/481,053

(22) Filed: Sep. 21, 2021

(65) Prior Publication Data
US 2022/0006408 A1 Jan. 6, 2022

Related U.S. Application Data

(63) Continuation of application No. PCT/JP2020/012878, filed on Mar. 24, 2020.

(30) Foreign Application Priority Data

Mar. 27, 2019 (JP) ................. 2019-060773

(51) Int. Cl.
*H02P 23/28* (2016.01)
*H02K 9/19* (2006.01)
(Continued)

(52) U.S. Cl.
CPC ............ *H02P 23/28* (2016.02); *H02K 9/19* (2013.01); *H02K 21/02* (2013.01); *H02P 25/022* (2013.01); *H02P 27/06* (2013.01); *H02K 2209/00* (2013.01)

(58) Field of Classification Search
CPC ........ H02P 23/28; H02P 25/022; H02P 27/06; H02K 9/19; H02K 21/02; H02K 2209/00
See application file for complete search history.

(56) References Cited

U.S. PATENT DOCUMENTS

| 2005/0057210 A1* | 3/2005 | Ueda | H02M 5/458 |
| | | | 318/801 |
| 2017/0077829 A1* | 3/2017 | Taniguchi | H02M 5/458 |

FOREIGN PATENT DOCUMENTS

| EP | 3 358 719 A1 | 8/2018 |
| JP | 7-172155 A | 7/1995 |

(Continued)

OTHER PUBLICATIONS

Translation of JP2002098086 has been attached.*

(Continued)

*Primary Examiner* — Zoheb S Imtiaz
(74) *Attorney, Agent, or Firm* — Global IP Counselors, LLP

(57) ABSTRACT

A motor drive apparatus includes a motor, a power converter, and a controller that controls the voltage supplied to the motor by the power converter. The power converter converts a voltage of a 400 V-class AC power supply to a voltage with an effective value lower than an effective value of the 400 V-class AC power supply. The power converter converts the voltage by a switching operation of a plurality of switching elements. The motor is configured so that a value of φ×Vx/Ld is greater than Pmax when an effective value voltage Vx=200 V. A d-axis inductance of the motor is Ld. A flux linkage of the motor is φ. A maximum output of the motor in a device where the motor is mounted is Pmax. The controller has a control mode in which an effective value voltage higher than Vx is applied to the motor.

11 Claims, 3 Drawing Sheets

(51) Int. Cl.
*H02K 21/02* (2006.01)
*H02P 25/022* (2016.01)
*H02P 27/06* (2006.01)

(56) References Cited

FOREIGN PATENT DOCUMENTS

| JP | 2002-98086 A | | 4/2002 |
|---|---|---|---|
| JP | 2002098086 | * | 5/2002 |
| JP | 2010-4665 A | | 1/2010 |
| JP | 2010-16994 A | | 1/2010 |
| JP | 2016-36900 A | | 3/2016 |
| JP | 2018-160959 A | | 10/2018 |

OTHER PUBLICATIONS

International Preliminary Report of corresponding PCT Application No. PCT/JP2020/012878 dated Oct. 7, 2021.
European Search Report of corresponding EP Application No. 20 77 7164.3 dated Oct. 17, 2022.
International Search Report of corresponding PCT Application No. PCT/JP2020/012878 dated Jun. 23, 2020.

* cited by examiner

MOTOR DRIVE APPARATUS AND COOLING APPARATUS

CROSS-REFERENCE TO RELATED APPLICATIONS

This is a continuation of International Application No. PCT/JP2020/012878 filed on Mar. 24, 2020, which claims priority to Japanese Patent Application No. 2019-060773, filed on Mar. 27, 2019. The entire disclosures of these applications are incorporated by reference herein.

BACKGROUND

Field of Invention

The present disclosure relates to a motor drive apparatus and a cooling apparatus.

Background Information

Some motor drive apparatuses include a power converter outputting power of a predetermined voltage and frequency regardless of input power, for use in countries with a different power supply voltage (see, e.g., Japanese Unexamined Patent Publication No. 2002-98086).

SUMMARY

A first aspect of the present disclosure is directed to a motor drive apparatus including a motor, a power converter, and a controller. The power converter is configured to convert a voltage of a 400 V-class AC power supply to a voltage with an effective value lower than an effective value of the voltage of the 400 V-class AC power supply, and supply the voltage to the motor. The controller is configured to control the voltage supplied to the motor by the power converter. The power converter is configured to convert the voltage of the 400 V-class AC power supply by a switching operation of a plurality of switching elements. The motor is configured so that a value of $\varphi \times Vx/Ld$ is greater than Pmax when an effective value voltage $Vx=200$ V. A d-axis inductance of the motor is indicated by Ld. A flux linkage of the motor is indicated by $\varphi$. A maximum output of the motor in a device where the motor is mounted is indicated by Pmax. The controller has a control mode in which an effective value voltage higher than the effective value voltage Vx is applied to the motor.

DETAILED DESCRIPTION OF EMBODIMENT(S)

Embodiment 1 will be described.
A motor drive apparatus of the present disclosure is used for driving a motor for a compressor of a refrigerant circuit. This refrigerant circuit is incorporated into an oil cooling apparatus. The oil cooling apparatus controls the oil temperature in a machine tool or the like.

Figure 1:
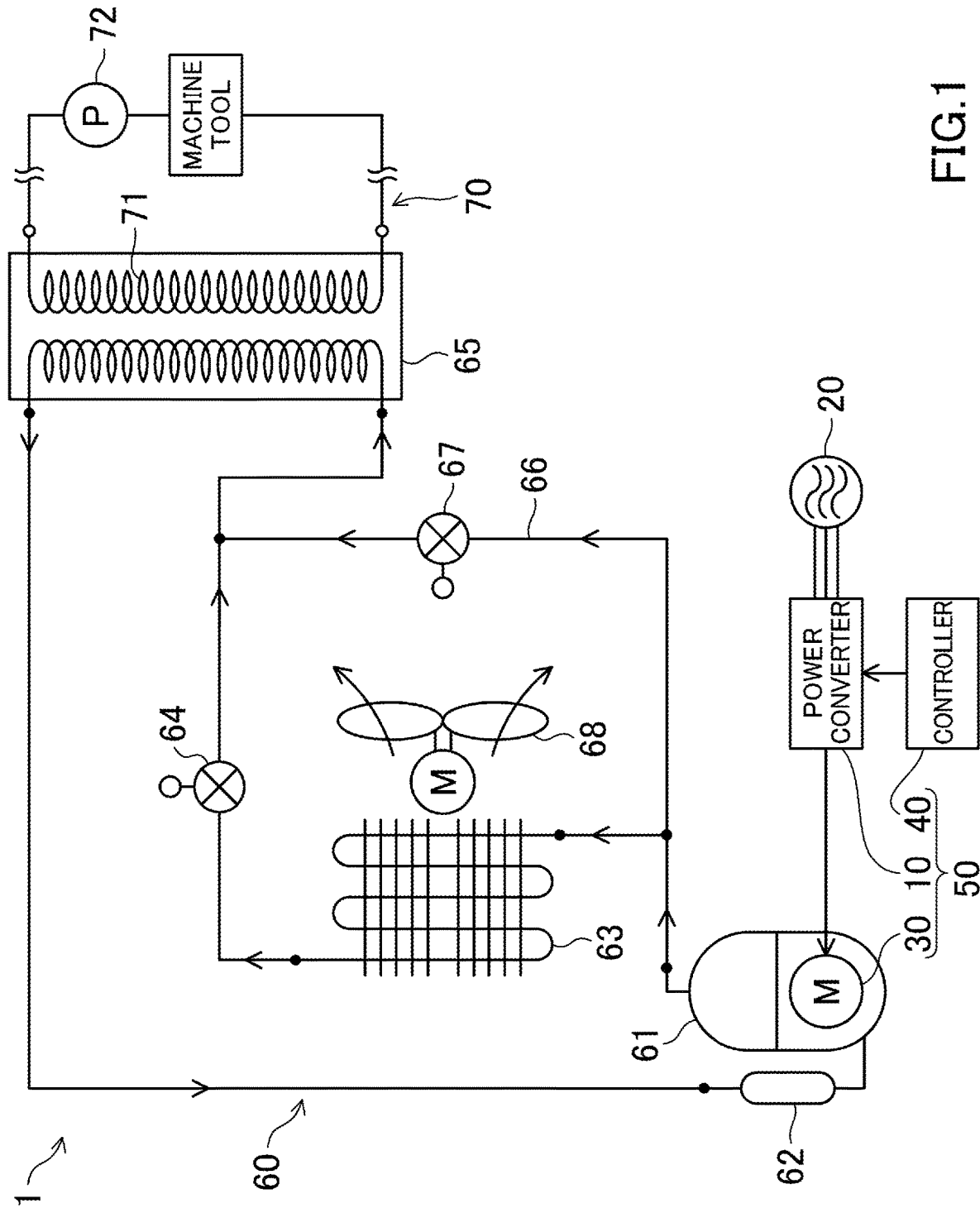
FIG. 1 illustrates a configuration of an oil cooling apparatus.

FIG. 1 illustrates a configuration of an oil cooling apparatus (1) of the present disclosure. The oil cooling apparatus (1) includes a refrigerant circuit (60), a cooling oil circuit (70), a power converter (10), and a controller (40).

Refrigerant Circuit

As illustrated in FIG. 1, the refrigerant circuit (60) includes a compressor (61), an accumulator (62), a condenser (63), an expansion valve (64), an evaporator (65), and a bypass valve (67). These elements are connected in the refrigerant circuit (60), as illustrated in FIG. 1. The refrigerant circuit (60) is a closed circuit. The refrigerant is sealed in the refrigerant circuit (60) as a heating medium. The refrigerant circulates in the refrigerant circuit (60) as the compressor (61) operates. The circulation of the refrigerant causes the refrigerant circuit (60) to perform a refrigeration cycle.

The compressor (61) compresses the refrigerant. The compressor (61) includes a motor (30). The configuration of the motor (30) will be described in detail later. When the motor (30) is driven, the compressor (61) compresses and discharges the refrigerant. Various compressors, such as a so-called scroll compressor or a rotary compressor, can be used as the compressor (61). In the compressor (61), the motor (30) is exposed to the refrigerant. The accumulator (62) separates the refrigerant in a state of a mixture of a liquid refrigerant and a gas refrigerant into the liquid refrigerant and the gas refrigerant.

The condenser (63) is a heat exchanger that transfers heat between the refrigerant and air. In the vicinity of the condenser (63), a fan (68) is provided. The evaporator (65) is a heat exchanger that transfers heat between the refrigerant and the oil of the machine tool. The expansion valve (64) is a so-called electronic expansion valve. The opening degree of the expansion valve (64) is continuously controllable.

The refrigerant circuit (60) is provided with a bypass channel (66) through which the refrigerant flows by bypassing the condenser (63). A bypass valve (67) is provided at an intermediate portion of the bypass channel (66). The bypass valve (67) is a motor-operated valve. The opening degree of the bypass valve (67) is continuously controllable.

Cooling Oil Circuit

The cooling oil circuit (70) includes a heat exchanger (71) and a pump (72). The cooling oil circuit (70) includes a pipe connecting the heat exchanger (71) and the machine tool. The pump (72) is provided in an intermediate portion of the pipe. The pump (72) circulates the oil (material to be cooled) between the machine tool and the heat exchanger (71). The heat exchanger (71) transfers heat between the refrigerant of the evaporator (65) and the oil.

Power Converter

Figure 2:
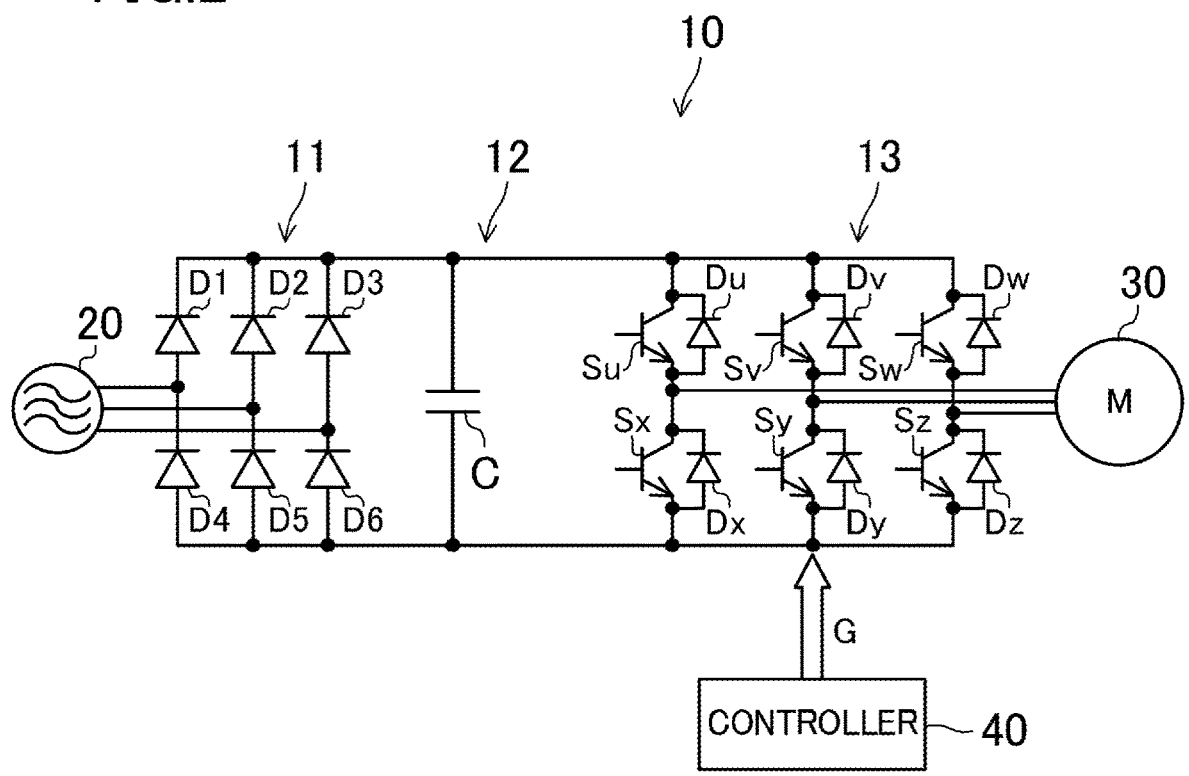
FIG. 2 is a block diagram illustrating a configuration of a power converter.

FIG. 2 is a block diagram illustrating a configuration of the power converter (10). The power converter (10) is configured to convert the voltage through switching operation of the switching element. The power converter (10) includes a converter circuit (11), a DC link unit (12), and an inverter circuit (13), as illustrated in FIG. 2.

The converter circuit (11) is connected to a three-phase AC power supply (20). In this example, the AC power supply (20) is a 400 V commercial power supply. The converter circuit (11) is a full-wave rectifier for the power supply voltage from the AC power supply (20). The converter circuit (11) includes six diodes (D1 to D6). The six diodes (D1 to D6) are connected in a bridge configuration.

The DC link unit (12) has a capacitor (C). The capacitor (C) is connected to an output node of the converter circuit (11). The DC link unit (12) generates a DC voltage from an output of the converter circuit (11) (from the full-wave rectified power supply voltage). The capacitor (C) smooths the output of the converter circuit (11). For example, an electrolytic capacitor is used as the capacitor (C).

The inverter circuit (13) converts, by a switching operation, the DC voltage generated by the DC link unit (12) into a three-phase AC voltage. The inverter circuit (13) supplies the three-phase AC voltage obtained by the switching operation to the motor (30).

The inverter circuit (13) includes six switching elements (Su, Sv, Sw, Sx, Sy, Sz) and six freewheeling diodes (Du, Dv, Dw, Dx, Dy, Dz). The six switching elements (Su, Sv, Sw, Sx, Sy, Sz) are connected in a bridge configuration. More specifically, the inverter circuit (13) has three switching legs. Each switching leg includes two switching elements connected to each other in series.

Each of the three switching legs includes an upper-arm switching element (Su, Sv, Sw) and a lower-arm switching element (Sx, Sy, Sz), and midpoints between the upper and lower switching elements are connected to coils of respective phases (i.e., u-phase, v-phase, and w-phase coils) of the motor (30). Each of the freewheeling diodes (Du, Dv, Dw, Dx, Dy, Dz) is connected in antiparallel to a corresponding one of the switching elements (Su, Sv, Sw, Sx, Sy, Sz).

Motor

The motor (30) is an interior permanent magnet motor (IPM motor). More specifically, the motor (30) is an IPM synchronous motor with a q-axis inductance Lq larger than a d-axis inductance Ld.

Here, the d-axis inductance of the motor (30) is indicated by Ld; a flux linkage of the motor (30) is indicated by $\varphi$; and a maximum output of the motor (30) in the device where the motor (30) is mounted is indicated by Pmax.

The value of the Pmax changes depending on the amount of output required in the device (the oil cooling apparatus (1) in this example) where the motor (30) is incorporated. The maximum output Pmax is (torque of the motor (30) obtained in the maximum range of voltage and current applied to the motor (30))×(the maximum value of the number of revolutions). The maximum output Pmax decreases with the decrease in voltage applied to the motor (30). In this example, the maximum output Pmax is the maximum output (torque×number of revolutions) obtained at the current with which the power converter (10) is continuously operable without overheating when 200 V that is the minimum power supply voltage (effective value) in the 200 V-class regions is supplied.

The motor (30) of the present embodiment is configured so that the value of $\varphi \times Vx/Ld$ is greater than the Pmax when an effective value voltage Vx=200 V (see the following Expression 1).

$$P\max < \varphi \times Vx/Ld \qquad \text{Expression 1}$$

Controller

The controller (40) includes a microcomputer and a memory device storing a program for operating the microcomputer (neither shown in the drawings). A motor drive apparatus (50) is comprised of the controller (40), the motor (30), and the power converter (10).

The controller (40) controls the three-phase AC voltage supplied to the motor (30) by the power converter (10). In this example, the controller (40) controls the power converter (10) to convert a voltage of the 400 V-class AC power supply (20) to a voltage of an effective value lower than the effective value of the voltage of the 400 V-class AC power supply. In other words, the power converter (10) steps down the voltage of the AC power supply (20).

The controller (40) includes the following two control modes as control modes to control the voltage supplied to the motor (30) by the power converter (10). One of the two control modes (hereinafter a first control mode) is a control mode for performing a maximum efficiency control on the motor (30). The other control mode (hereinafter a second control mode) is a control mode for performing a flux weakening control on the motor (30).

The controller (40) controls the switching operation of the power converter (10) so that (I) a voltage between windings of the same phase in the motor (30), (II) a voltage between windings of different phases in the motor (30), and (III) a voltage between windings of each phase in the motor (30) and ground are smaller than a voltage at start of partial discharge in the motor (30) in both of the first and second control modes.

As an example, the switching speed of the switching elements (Su, Sv, Sw, Sx, Sy, Sz) may be reduced to decrease respective voltages in the motor (30). For example, when the switching speed is reduced, the loss in the inverter circuit (13) increases. On the other hand, the voltage at start of partial discharge increases with an increase in the pressure applied to the motor (30). Thus, when the pressure of the refrigerant applied to the motor (30) in the compressor (61) is equal to or lower than a threshold value, the switching speed is set to low, and when the pressure of the refrigerant applied to the motor (30) is higher than the threshold value, the switching speed is switched to high. By doing so, it is possible to make the voltage (see (I) to (III)) related to the partial discharge lower than the voltage at start of partial discharge, while reducing an increase in the loss in the inverter circuit (13). The switching speed may be increased in proportion to the pressure of the refrigerant applied to the motor (30). As another example, the controller (40) may change the sequence of the voltage vectors output by the inverter circuit (13) to lower the voltage in the motor (30).

Operation of Oil Cooling Apparatus

In the motor drive apparatus (50), the control of the motor (30) differs depending on the power supply voltage at the destination of the oil cooling apparatus (1). The operation of the motor drive apparatus (50) will be described below separately for the case where the AC power supply (20) is a 400 V class (commercial power supply of e.g., 380 V, 400 V, 415 V, 440 V, 460 V, 480 V, etc.) and the case where the AC power supply (20) is a 200 V class (commercial power supply of e.g., 200 V, 220 V, 230 V, or 240 V).

For the convenience of description, the oil cooling apparatus (1) using a 400 V-class AC power supply will be referred to as a "400 V apparatus," and the oil cooling apparatus (1) using a 200 V-class AC power supply will be referred to as a "200 V apparatus." Motors (30) of the same specifications are used in the 400 V apparatus and the 200 V apparatus. In other words, both the motor (30) of the 400 V apparatus and the motor (30) of the 200 V apparatus satisfy Expression 1. The inverter circuit (13) of the 200 V apparatus does not need to be capable of outputting a voltage equal to or higher than 200 V.

Operation Under 200 V-Class AC Power Supply

Figure 3:
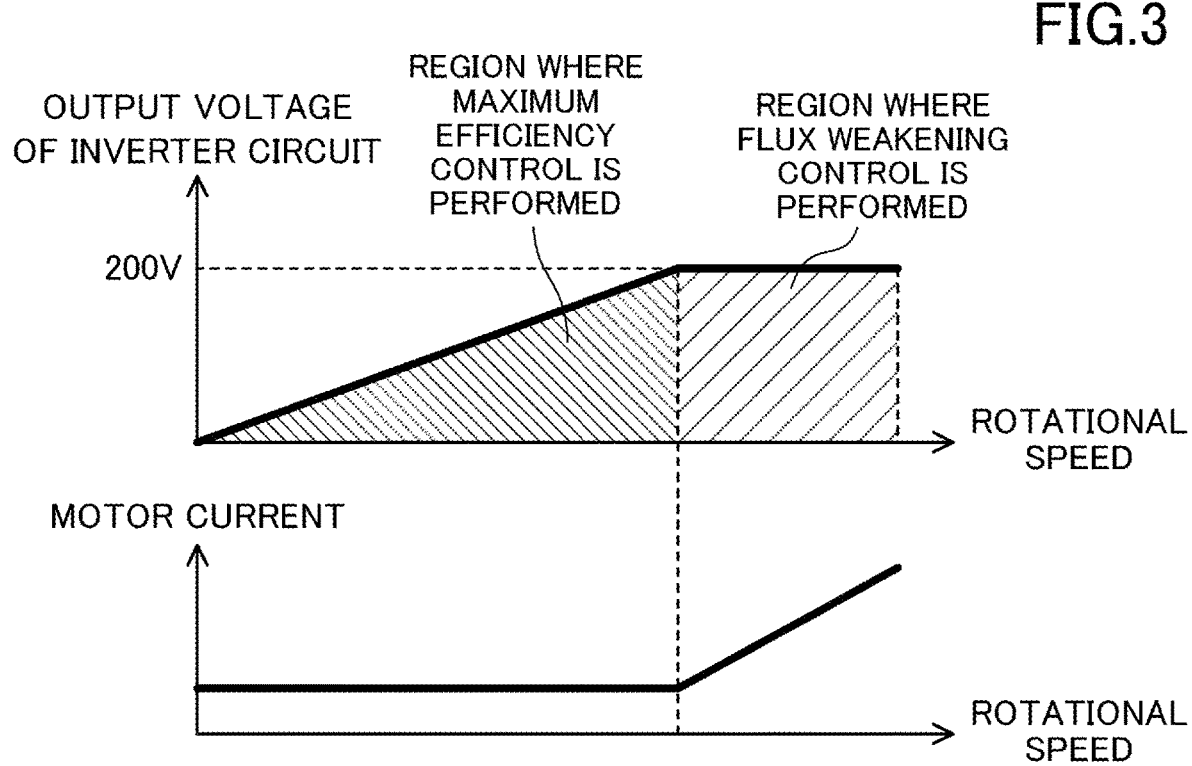
FIG. 3 illustrates an operating area of a 200 V apparatus.

FIG. 3 illustrates an operating area of the 200 V apparatus. In the upper graph of FIG. 3, the horizontal axis represents the rotational speed of the motor (30), and the vertical axis represents the output voltage (unit: V) of the inverter circuit (13). In the lower graph of FIG. 3, the horizontal axis represents the rotational speed of the motor (30), and the vertical axis represents the motor current.

When the oil cooling apparatus (1) is used in a 200 V-class power supply, the maximum efficiency control (the first control mode) is performed in an operating area in which the output voltage of the inverter circuit (13) is equal to or smaller than 200 V and in which the rotational speed is such a rotational speed that enables the maximum efficiency control (hereinafter, referred to as a threshold rotational speed (Rt)).

In an operating area in which the rotational speed is greater than the threshold rotational speed (Rt), the controller (40) performs the flux weakening control (the second control mode) on the motor (30). Thus, although the motor current increases approximately in proportion to the rotational speed (see FIG. 3), the costs of the oil cooling apparatus (1) including the power converter (10) are reduced.

Operation Under 400 V-Class AC Power Supply

Figure 4:
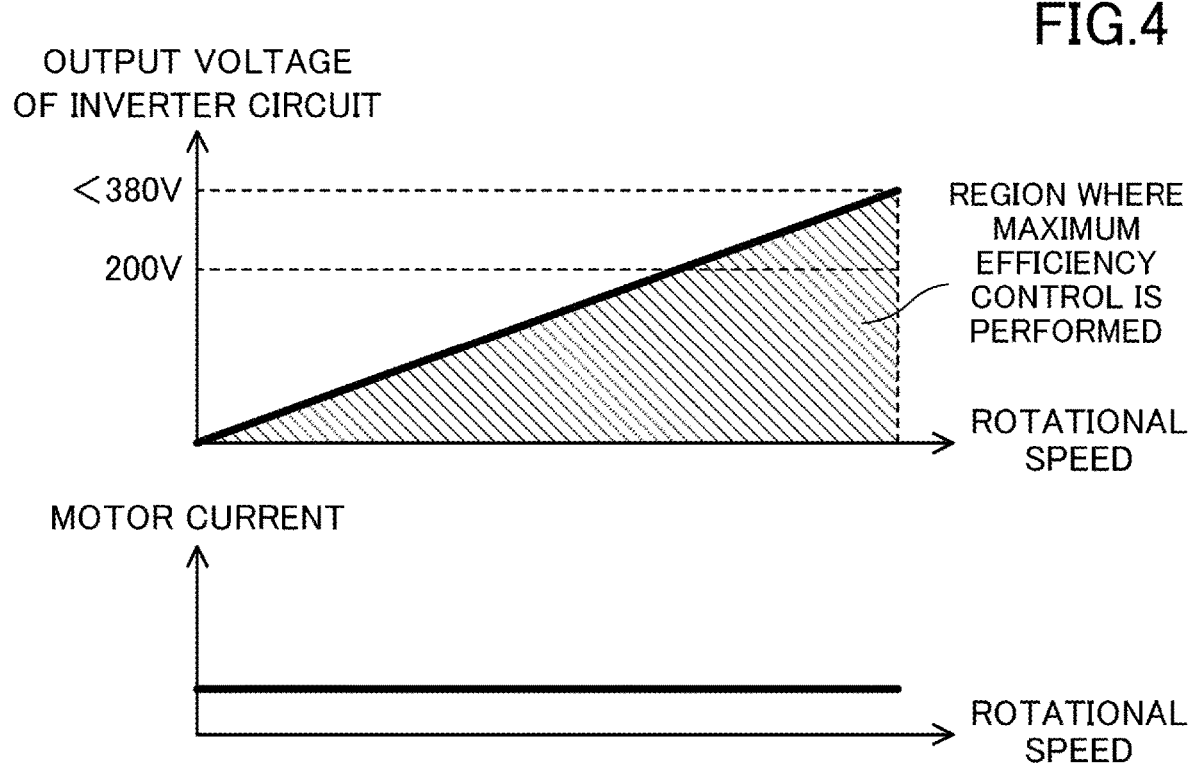
FIG. 4 illustrates an operating area of a 400 V apparatus.

FIG. 4 illustrates an operating area of the 400 V apparatus. In the upper graph of FIG. 4, the horizontal axis represents the rotational speed of the motor (30), and the vertical axis represents the output voltage (unit: V) of the inverter circuit (13). In the lower graph of FIG. 4, the horizontal axis represents the rotational speed of the motor (30), and the vertical axis represents the motor current.

When the AC power supply (20) is a 400 V-class commercial power supply, the controller (40) performs only the maximum efficiency control (the first control mode) on the motor (30). For example, even when the output voltage of the inverter circuit (13) exceeds 200V, the first control mode is executed. In this example, the first control mode is executed up to the voltage of about 380 V.

In this way, the controller (40) includes a control mode that applies an effective value voltage higher than the effective value voltage Vx (=200 V) to the motor (30). The flux weakening control is not necessary even when the voltage exceeds 200 V, because the configuration of the motor (30) satisfies Expression 1.

In the present disclosure, (a threshold value of the overcurrent protection)/(an effective value of the motor current when the Pmax is obtainable) will be called a current ratio (R). The motor drive apparatus (50) of the present disclosure includes an overcurrent protection mechanism for stopping the operation when an instantaneous value of the motor current exceeds the threshold value to avoid demagnetization of the magnets of the motor (30). In the present disclosure, the flux weakening control is not performed in the operation under the 400 V-class AC power supply. For this reason, in the present disclosure, the motor current decreases, and the current ratio (R) is equal to or greater than 2.68 (=380 V/200 V×√2).

Bypass Valve Control

The cooling capability of the oil cooling apparatus (1) may be required to be low, depending on the oil temperature. The cooling capability may be kept low by reducing the rotational speed of the motor (30). In this case, depending on the required cooling capability, an operating point required for the compressor (61) may be out of the operable region of the compressor (61). Here, the "operable region" means a region where the compressor (61) does not break and a sensorless control is stably performed. The "sensorless control" is a technique of estimating, without using a sensor, a position of the rotor of the motor (30) in the rotational direction, and controlling the motor (30) based on that estimation.

Thus, if the operating point required for the compressor (61) is out of the operable region, the controller (40) reduces the cooling capability in another way. In the present embodiment, the controller (40) controls the bypass valve (67). Specifically, if the operating point required for the compressor (61) is out of the operable region, the controller (40) increases the opening degree of the bypass valve (67). Thus, the cooling capability of the oil cooling apparatus (1) is reduced. If the operating point required for the compressor (61) is not out of the operable region, the controller (40) decreases the opening degree of the bypass valve (67). Thus, the cooling capability of the oil cooling apparatus (1) increases.

In summary, in the present embodiment, a motor drive apparatus includes: a motor (30); a power converter (10) configured to convert a voltage of a 400 V-class AC power supply to a voltage with an effective value lower than an effective value of the voltage of the 400 V-class AC power supply, and supply the voltage to the motor (30); and a controller (40) configured to control a voltage to be supplied to the motor (30) by the power converter (10).

The power converter (10) is configured to convert a voltage by a switching operation of switching elements (Su, Sv, Sw, Sx, Sy, Sz), the motor (30) is configured so that a value of φ×Vx/Ld is greater than Pmax when an effective value voltage Vx=200 V, where a d-axis inductance of the motor (30) is indicated by Ld, a flux linkage of the motor (30) is indicated by φ, and a maximum output of the motor (30) in a device where the motor (30) is mounted is indicated by Pmax, and the controller (40) has a control mode that applies an effective value voltage higher than the effective value voltage Vx to the motor (30).

Advantages of Embodiment

In the motor drive apparatus (50), the specifications of the motor (30) satisfy Expression 1. When Expression 1 is satisfied, it is not necessary to perform the flux weakening control even in the case in which an effective value voltage equal to or higher than 200 V is applied to the motor (30). In other words, in the motor drive apparatus (50), the motor current in a motor drive apparatus configured to drive the motor under the 400 V class power source may be reduced. Reduction in the motor current enables downsizing of the cooling apparatus (e.g., a heat sink for the switching elements (Su, Sv, Sw, Sx, Sy, Sz)) for the inverter circuit (13) and the cooling member for the motor.

The motor (30) may be used in the 200 V apparatus as well. Reduction in the motor current of the 400 V apparatus enables downsizing of the cooling member for the inverter circuit (13) and the cooling member for the motor. Thus, using the cooling member for the inverter circuit (13) and the cooling member for the motor (30) in the 200 V apparatus does not result in an increase in costs. As a result, the number of components common to the 200 V apparatus and the 400 V apparatus increases, thereby making it possible to reduce manufacturing costs of the oil cooling apparatus (1).

In many 400 V-class power supply regions, the voltage of the power supply is unstable and tends to drop. The maximum effective value of the three-phase AC voltage supplied to the motor by the power converter is proportional to the input voltage of the 400 V-class AC power supply. Drop in the voltage of the AC power supply results in a decrease in the maximum effective value of the three-phase AC voltage supplied to the motor.

For example, when the motor is designed for use in a 400 V-class power supply region with Vx set to be 380 V, the output of the motor decreases as the voltage of the 400 V-class AC power supply drops from 380 V. When the output of the motor decreases, the maximum output Pmax cannot be obtained.

On the other hand, by the method of the present disclosure, the motor (30) can achieve the maximum output Pmax at the effective value voltage Vx=200 V. By the method of the present disclosure, the maximum output Pmax can be achieved in a range in which the flux weakening control is not performed even when the voltage of the AC power supply (20) drops, and the maximum output Pmax can be achieved even when the flux weakening control is performed in a range of current with which the power converter (10) is continuously operable without overheating. In the present disclosure, it is possible to widen the voltage range of the power supply which enables stable operation. In other words, in the present disclosure, the threshold value of the low voltage abnormality may be lowered. The threshold value of the low voltage abnormality is set to stop the operation when abnormal drop of the voltage of the power supply occurs.

In the present disclosure, the current ratio (R) is equal to or greater than 2.68 (=380 V/200 V×√2). Thus, in the present disclosure, the motor current does not increase to the threshold value for the overcurrent protection. In other words, in the present disclosure, the operation is less likely to stop as a result of overcurrent protection.

In the present disclosure, the current ratio (R) at Pmax can be set to 2.68 in the 400 V region. The current peak can thus be increased until the current ratio (R) approaches 1. It is therefore possible to increase the instantaneous torque and thereby reduce vibrations of the compressor.

In the motor drive apparatus (50), the controller (40) reliably prevents partial discharge. In other words, in the present embodiment, dielectric breakdown does not occur in normal operation.

Since the cooling capability of the oil cooling apparatus (1) may be adjusted by the bypass valve (67), the operating point of the compressor (61) (in other words, the operating point of the motor (30)) may be reliably kept within the operable region.

OTHER EMBODIMENTS

The motor drive apparatus (50) may be used in a device other than the oil cooling apparatus (1). For example, the motor drive apparatus (50) may be used in an air conditioner for a room, a warehouse, a transport container, and the like. In other words, the material to be cooled is not limited to oil (liquid).

The configurations of the refrigerant circuit (60) and the cooling oil circuit (70) are examples.

While the embodiments and the variations thereof have been described above, it will be understood that various changes in form and details may be made without departing from the spirit and scope of the claims. The foregoing embodiments and variations thereof may be combined and replaced with each other without deteriorating the intended functions of the present disclosure.

As described above, the present disclosure is useful for a motor drive apparatus and a cooling apparatus.

The invention claimed is:

1. A motor drive apparatus comprising:
a motor configured to be mounted in a device and to drive the device with an output equal to or smaller than a maximum output;
a power converter configured to
receive electric power from an AC power supply,
convert a voltage of the AC power supply to a voltage with an effective value equal to or lower than an effective value of the voltage of the AC power supply by executing a switching operation of a plurality of switching elements, and
supply the voltage to the motor,
the power converter being further configured to convert the voltage of the AC power supply to a voltage with an effective value lower than the effective value of the voltage of the AC power supply when the AC power supply is a 400 V-class AC power supply; and
a controller configured to control the voltage supplied to the motor by the power converter,
the motor being configured so that a value of $\varphi \times Vx/Ld$ is greater than Pmax when an effective value voltage Vx applied to the motor is equal to 200 V, with
a d-axis inductance of the motor being indicated by Ld,
a flux linkage of the motor being indicated by $\varphi$,
the maximum output of the motor being indicated by Pmax, and
the controller having a first control mode in which the effective value voltage Vx applied to the motor is higher than 200 V.

2. The motor drive apparatus according to claim 1, wherein
the motor is an interior permanent magnet synchronous motor with a q-axis inductance Lq larger than the d-axis inductance Ld.

3. A motor drive apparatus comprising:
a motor, the motor being an interior permanent magnet synchronous motor with a q-axis inductance Lq larger than a d-axis inductance Ld;
a power converter configured to
convert a voltage of a 400 V-class AC power supply to a voltage with an effective value lower than an effective value of the voltage of the 400 V-class AC power supply, and
supply the voltage to the motor; and
a controller configured to control the voltage supplied to the motor by the power converter,
the power converter being configured to convert the voltage of the 400 V-class AC power supply by a switching operation of a plurality of switching elements,
the motor being configured so that a value of $\varphi \times Vx/Ld$ is greater than Pmax when an effective value voltage Vx=200 V, where $\varphi$ indicates a flux linkage of the motor and Pmax indicates a maximum output of the motor in a device where the motor is mounted being indicated by Pmax,
the controller having a control mode in which an effective value voltage higher than the effective value voltage Vx is applied to the motor, and the controller being configured to control the switching operation so that
 a voltage between windings of a same phase in the motor is smaller than a voltage at a start of partial discharge in the motor,
 a voltage between windings of different phases in the motor is smaller than the voltage at the start of partial discharge in the motor, and
 a voltage between windings of each phase in the motor and ground is smaller than the voltage at the start of partial discharge in the motor.

4. A cooling apparatus including the motor drive apparatus according to claim 2, the cooling apparatus further comprising:
 a refrigerant circuit configured to perform a refrigeration cycle with a refrigerant circulated by a compressor that uses the motor drive apparatus,
 the refrigerant cooling a material to be cooled by heat transfer between the refrigerant and the material to be cooled.

5. The cooling apparatus according to claim 4, wherein the refrigerant circuit includes
 a heat exchanger disposed on a discharge side of the compressor,
 a channel through which the refrigerant flows by bypassing the heat exchanger, and
 a valve provided at an intermediate portion of the channel.

6. The cooling apparatus according to claim 4, wherein the material to be cooled is liquid.

7. The motor drive apparatus according to claim 1, wherein the controller is configured to control the switching operation so that
 a voltage between windings of a same phase in the motor is smaller than a voltage at a start of partial discharge in the motor,
 a voltage between windings of different phases in the motor is smaller than the voltage at the start of partial discharge in the motor, and
 a voltage between windings of each phase in the motor and ground is smaller than the voltage at the start of partial discharge in the motor.

8. The motor drive apparatus according to claim 1, wherein
 the first control mode is a control mode in which a maximum efficiency control is executed.

9. The motor drive apparatus according to claim 8, wherein
 the controller further includes a second control mode different from the first control mode, the second control mode being a control mode in which a flux weaking control is executed.

10. The motor drive apparatus according to claim 9, wherein
 the power converter is further configured to convert the voltage of the AC power supply to a voltage with an effective value equal to or lower than 200 V when the AC power supply is a 200 V-class AC power supply,
 the controller is configured to execute the first control mode exclusively without executing the second control mode when the AC power supply is the 400 V-class AC power supply, and
 the controller is configured to selectively execute the first control mode or the second control mode in accordance with a rotational speed of the motor when the AC power supply is the 200 V-class power supply.

11. The motor drive apparatus according to claim 10, wherein
 when the AC power supply is the 200 V-class power supply, the controller executes the first control mode when the rotational speed of the motor is equal to or smaller than a threshold rotational speed, and the controller executes the second control mode when the rotational speed of the motor is larger than the threshold rotational speed.

* * * * *